J. BERNING.
COMPRESSED AIR DISTRIBUTING OR REGULATING DEVICE FOR PULSOMETERS AND SIMILAR APPARATUS.
APPLICATION FILED FEB. 29, 1912.
1,051,540.
Patented Jan. 28, 1913.
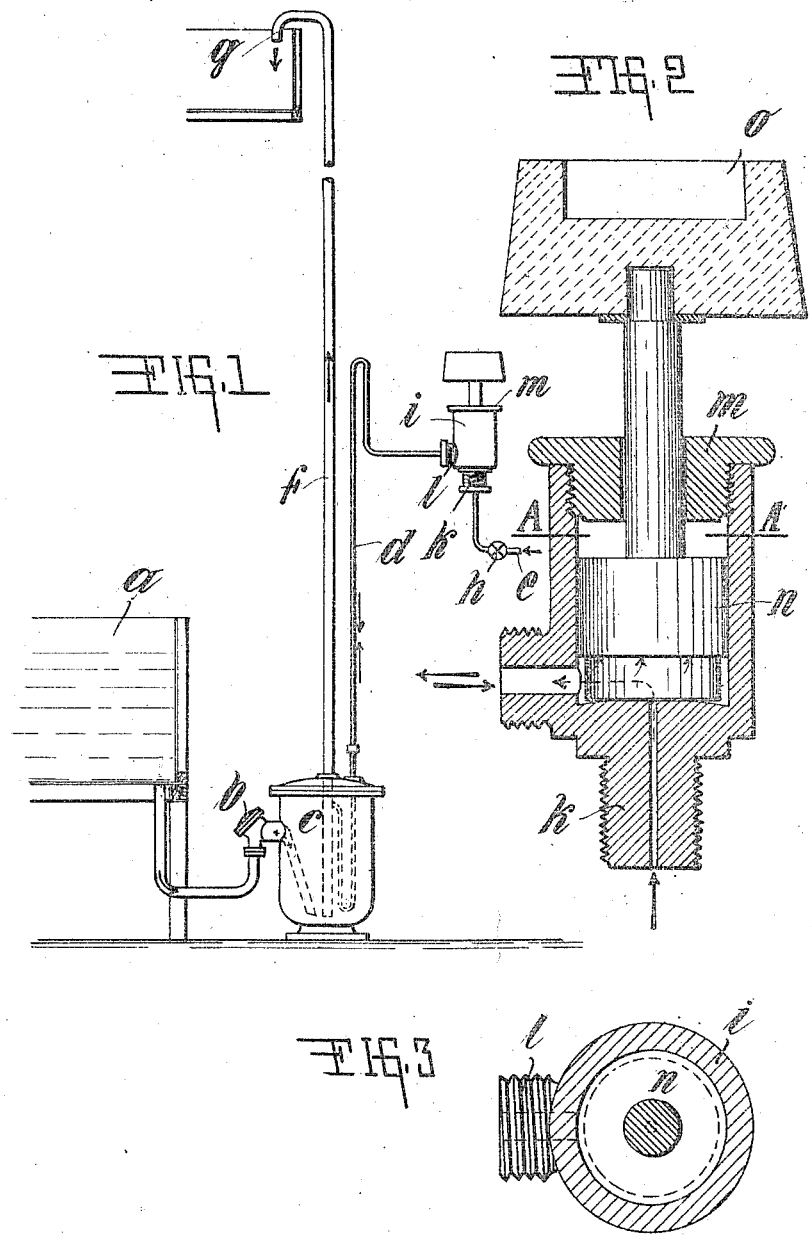

UNITED STATES PATENT OFFICE.

JOHANN BERNING, OF DUSSELDORF, GERMANY.

COMPRESSED-AIR DISTRIBUTING OR REGULATING DEVICE FOR PULSOMETERS AND SIMILAR APPARATUS.

1,051,540.

Specification of Letters Patent. Patented Jan. 28, 1913.

Application filed February 29, 1912. Serial No. 680,700.

*To all whom it may concern:*

Be it known that I, JOHANN BERNING, a subject of the King of Prussia, residing at 88<sup>d</sup> Oberloilker Allee, Dusseldorf, in the Kingdom of Prussia and German Empire, have invented certain new and useful Improvements in Compressed-Air Distributing or Regulating Devices for Pulsometers and Similar Apparatus, of which the following is a specification.

The present invention has for its object a compressed air controlling device for pulsometers and similar apparatus for elevating liquids of all kinds.

The new controlling device comprises a pressure vessel which is located between the liquid storage reservoir and the point to which the liquid is to be conveyed and the device is so constructed that the air contained in the said pressure vessel is compressed by the liquid to be elevated, while the thus compressed air is employed for controlling the access of a fluid pressure medium (compressed air or the like) to the pressure vessel.

In pulsometers and similar apparatus hitherto employed the access of the compressed air for forcing up the liquid has generally been controlled by means of floats. Movements of such floats are transmitted through a long rod to a complicated mechanism acting to control the access of the compressed air to the delivery chamber. The chief defects of these old controlling devices are as follows: their height is considerable, the distributing gear is complicated and the movable parts wear out speedily, especially when acids have to be raised, thus causing a large expenditure for repairs.

To avoid these defects is the object of my invention in which an extremely simple controlling device is used which does not come in contact with the liquid to be elevated but can be located at any suitable place beyond the reach of the liquid. Any convenient vessel can be used as the pressure vessel. The compressed air controlling device according to my invention is illustrated by way of example in the accompanying drawing, in which:—

Figure 1 shows diagrammatically the entire apparatus for raising liquid together with the compressed air controlling device. Fig. 2 shows the controlling device proper in section. Fig. 3 is a cross section along line A—A of Fig. 2.

The liquid to be elevated flows from the storage tank $a$ through the non-return valve $b$ which is arranged at a lower level into the closed pressure vessel $c$. Owing to the rise of the liquid the air contained in $c$ is compressed. When the vessel $c$ is nearly filled the air therein is compressed to such an extent that, through the connecting pipe $d$, it is able to actuate the controlling valve $i$ arranged intermediate between the storage tank $a$ and the place to which the liquid is to be conveyed so that the compressed air supplied from a compressor or air reservoir (not shown) through said valve $i$ will enter the pressure vessel $c$. The liquid therein then is forced up in the pipe $f$ and flows into the tank $g$ to which the liquid is to be conveyed. As soon as the elevation of the liquid into the tank $g$ has been completed, that is to say at the moment at which the compressed air begins to escape at $g$, the valve $i$ automatically shuts off further access of compressed air to the vessel $c$ through pipe $d$. The vessel $c$ is then again filled from the reservoir $a$ and the above-described operation begins once more. By closing the cock $h$ in the compressed air supply pipe $e$, the entire apparatus can be rendered inoperative at any time.

The distributing or controlling device proper consists of the valve $i$ with the pipe connections $k$ for the entrance of the compressed air and $l$ for the escape of the compressed air into the pipe $d$ conducting the air to the pressure vessel $c$, the screwed cover $m$, the movable piston $n$, which at its lower part is reduced in diameter so as to present a smaller area to the compressed air, and the weight $o$ carried by the piston rod.

When the pressure vessel $c$ is filled with the liquid to be raised, the air contained therein and entering the distributing device at $l$ has attained such a degree of pressure that it will force the piston $n$ upward. Immediately high pressure compressed air enters through the bore in the nipple $k$, and passes through the bore in the nipple $l$ into the pipe $d$ and the vessel $c$. When all the liquid in said vessel has been forced up through pipe $f$ into the tank $g$ the compressed air will escape from the pipe $f$ at its upper end, the pressure in the vessel $c$ and beneath the piston $n$ falls, and the piston descends and closes the bore in the nipple $k$, thereby shutting off further supply of compressed air to the vessel $c$.

What I claim is:—

In compressed air controlling device for pulsometers and like apparatus, the combination with a liquid storage reservoir, of a closed pressure vessel adapted to receive liquid from said reservoir, a liquid elevating pipe entering said pressure vessel, a compressed air supply pipe connected to the pressure vessel, and a controlling device at the other end of said air supply pipe, comprising a movable piston having a reduced portion and adapted to be operated by the air in said pressure vessel upon the compression of said air by the inflowing liquid, so as to open a passage to said pressure vessel from a source of a pressure medium, such as compressed air, and a weight connected to said piston to return the same to inoperative position upon the exhaust of the pressure medium.

In testimony whereof I have affixed my signature in presence of witnesses.

JOHANN BERNING. [L. S.]

Witnesses:
 SIEGFRIED BARTH,
 EMIL BLOESS,
 HELEN NUFER,
 ALBERT NUFER.